(12) United States Patent
Zhang (10) Patent No.: US 11,039,217 B2
(45) Date of Patent: Jun. 15, 2021

(54) COMPUTERIZED SYSTEM AND METHOD FOR PUSHING INFORMATION BETWEEN DEVICES

(71) Applicant: Advanced New Technologies Co., Ltd., Grand Cayman (KY)

(72) Inventor: Chaojun Zhang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 15/201,916

(22) Filed: Jul. 5, 2016

(65) Prior Publication Data
US 2017/0013316 A1    Jan. 12, 2017

(30) Foreign Application Priority Data

Jul. 7, 2015    (CN) .......................... 201510395406.9

(51) Int. Cl.
*H04N 21/226*    (2011.01)
*H04N 21/258*    (2011.01)
(Continued)

(52) U.S. Cl.
CPC ..... *H04N 21/4725* (2013.01); *H04N 21/4126* (2013.01); *H04N 21/436* (2013.01);
(Continued)

(58) Field of Classification Search
None
See application file for complete search history.

(56) References Cited

U.S. PATENT DOCUMENTS 8,412,798 B1    4/2013    Wang
9,100,701 B2    8/2015    Wang
(Continued)

FOREIGN PATENT DOCUMENTS

CA    2 814 292 A    11/2013
CN    101674323 A    3/2010
(Continued)

OTHER PUBLICATIONS

International Search Report and Written Opinion to corresponding International Application No. PCT/US16/41032 dated Oct. 11, 2016.
(Continued)

*Primary Examiner* — Brian T Pendleton
*Assistant Examiner* — Jean D Saint Cyr
(74) *Attorney, Agent, or Firm* — Seed IP Law Group LLP (57) ABSTRACT

Disclosed are systems and methods for improving interactions with and between computers in content communicating, rendering, recommending, generating, hosting and/or providing systems supported by or configured with personal computing devices, servers and/or platforms. The systems interact to identify and retrieve data within or across platforms, which can be used to improve the quality of data used in processing interactions between or among processors in such systems. The present disclosure provides systems and methods for pushing information between two network connected devices during rendering of content on one of the devices. While a first device is rendering content, additional information corresponding to the rendered content can be communicated to the connected second device and rendered on the second device without interrupting the playback of the content rendered on the first device.

18 Claims, 5 Drawing Sheets

(51) Int. Cl.

| | | |
|---|---|---|
| *H04N 21/418* | (2011.01) | |
| *H04N 21/422* | (2011.01) | |
| *H04N 21/426* | (2011.01) | |
| *H04N 21/43* | (2011.01) | |
| *H04N 21/4363* | (2011.01) | |
| *H04N 21/442* | (2011.01) | |
| *H04N 21/63* | (2011.01) | |
| *H04N 21/4725* | (2011.01) | |
| *H04N 21/41* | (2011.01) | |
| *H04N 21/81* | (2011.01) | |
| *H04N 21/858* | (2011.01) | |
| *H04N 21/8352* | (2011.01) | |
| *H04N 21/436* | (2011.01) | |
| *H04N 21/45* | (2011.01) | |
| *H04W 12/08* | (2021.01) | |
| *H04W 4/80* | (2018.01) | |
| *H04W 12/50* | (2021.01) | |
| *H04W 84/12* | (2009.01) | |
| *H04W 12/77* | (2021.01) | |

(52) U.S. Cl.
CPC ... *H04N 21/43637* (2013.01); *H04N 21/4516* (2013.01); *H04N 21/812* (2013.01); *H04N 21/8352* (2013.01); *H04N 21/8586* (2013.01); *H04W 4/80* (2018.02); *H04W 12/08* (2013.01); *H04W 12/50* (2021.01); *H04W 12/77* (2021.01); *H04W 84/12* (2013.01)

(56) References Cited

U.S. PATENT DOCUMENTS

| | | | |
|---|---|---|---|
| 9,154,841 | B2 | 10/2015 | Sinha et al. |
| 9,171,994 | B2 | 10/2015 | Maeng et al. |
| 2005/0108299 | A1 | 5/2005 | Nakajima |
| 2010/0138875 | A1* | 6/2010 | Johnson ............ G06Q 30/0601 725/60 |
| 2010/0262696 | A1* | 10/2010 | Oshiba ............ H04M 1/72412 709/227 |
| 2012/0238216 | A1 | 9/2012 | Hallowell et al. |
| 2013/0166488 | A1 | 6/2013 | Yang et al. |
| 2013/0212286 | A1 | 8/2013 | Krishnakumar et al. |
| 2013/0295848 | A1* | 11/2013 | O'Neill ................ H04W 68/00 455/41.2 |
| 2013/0339441 | A1 | 12/2013 | Vasquez et al. |
| 2014/0047072 | A1 | 2/2014 | Shuster |
| 2014/0095320 | A1* | 4/2014 | Sivaramakrishnan .. H04L 67/22 705/14.66 |
| 2014/0117079 | A1* | 5/2014 | Argue .................... G06Q 40/02 235/375 |
| 2014/0130076 | A1 | 5/2014 | Moore et al. |
| 2014/0143821 | A1 | 5/2014 | Shartzer |
| 2014/0208384 | A1 | 7/2014 | Youssefian et al. |
| 2014/0317650 | A1 | 10/2014 | Hjelmstedt et al. |
| 2015/0105017 | A1 | 4/2015 | Holmquist et al. |
| 2015/0147975 | A1 | 5/2015 | Li |
| 2015/0288667 | A1* | 10/2015 | Alder .................... H04L 63/061 713/171 |
| 2015/0310736 | A1* | 10/2015 | Yamada ............... H04B 5/0031 398/107 |
| 2016/0028646 | A1* | 1/2016 | Fablet .................... H04L 47/80 709/226 |
| 2016/0044122 | A1* | 2/2016 | Sandholm ............. H04W 4/06 709/206 |
| 2016/0165286 | A1* | 6/2016 | Zhang ................ H04N 21/4532 725/34 |
| 2018/0096393 | A1* | 4/2018 | Hartzell ................ H04W 4/023 |

FOREIGN PATENT DOCUMENTS

| | | |
|---|---|---|
| CN | 103339409 A | 10/2013 |
| CN | 103686290 A | 3/2014 |
| CN | 103929667 A | 7/2014 |
| CN | 104113786 A | 10/2014 |
| CN | 104581367 A | 4/2015 |
| CN | 104717549 A | 6/2015 |
| CN | 104735480 A | 6/2015 |
| JP | 10-177532 A | 6/1998 |
| JP | 2005121369 A | 5/2005 |
| JP | 2006-108902 H | 4/2006 |
| JP | 2012-70226 B1 | 4/2012 |
| JP | 2012-217053 A | 11/2012 |
| JP | 2013-118614 A | 6/2013 |
| KR | 20150066916 A | 6/2015 |
| WO | 2013/170198 A2 | 11/2013 |
| WO | 2014/163631 A1 | 10/2014 |

OTHER PUBLICATIONS

Office Action in corresponding JP Application No. 2017-564894 dated Nov. 19, 2019 (6 pages).
Examination Report to corresponding Indian Application No. 201747046274 dated Jul. 10, 2020 (7 pages).
Amazon Web Services (AWS)—Cloud Computing Services, available at http://web.archive.org/web/20150705222223/http://aws.amazon.com/ (Jul. 6, 2015).
Microsoft Azure: Cloud Computing Platform & Services, available at http://web.archive.org/web/20150706050518/http://azure.microsoft.com/en-us/ (Jul. 6, 2015).
Tencent Cloud, available at http://web.archive.org/web/20150706234739/http://www.qcloud.com/ (Jul. 6, 2015).
QingCloud, available at http://web.archive.org/web/20150704215753/https://www.qingcloud.com/ (Jul. 4, 2015).
UCloud—Professional Cloud Computing Providers, available at https://www.ucloud.cn/en/ (available as of Jul. 7, 2015, retrieved Feb. 14, 2017).

* cited by examiner

COMPUTERIZED SYSTEM AND METHOD FOR PUSHING INFORMATION BETWEEN DEVICES

CROSS-REFERENCE TO RELATED APPLICATIONS

This application claims the benefit of priority from Chinese Patent Application No. 201510395406.9 filed on Jul. 7, 2015, entitled "Method and System for Information Push," which is incorporated herein in by its entirety by reference.

TECHNICAL FIELD

The present disclosure relates to the technical field of communications, and more particularly to providing non-native functionality to computing systems for performing information push functionality.

BACKGROUND

With the rapid development of internet technology, the use of smart TVs and smart set-top boxes has gradually become a staple in people's everyday lives as people can watch a variety of videos provided by service providers through the smart TVs or the smart set-top boxes. The service providers can also add promotional information to the videos for product promotion. However, the promotional information added to the video may affect the users' viewing experience. On the other hand, if the users want to view the product information, the videos being played often need to be interrupted, which may also affect the users' viewing experience.

BRIEF DESCRIPTION OF DISCLOSURE

At least for the aforementioned shortcomings in the art, the instant disclosure provides systems and methods for pushing information between devices.

According to some embodiments, the present disclosure is realized through the implementation of the following technical schemes and functionality:

An information push method, applied to a first terminal for playing a multimedia file, wherein the method comprises the following steps:

obtaining a push identifier of a second terminal; and transmitting information relevant to a multimedia file to be pushed to the second terminal according to the push identifier, so that the second terminal displays the relevant information to be pushed.

According to some embodiments, the push identifier is the information used for connecting the first terminal with the second terminal; and the step of transmitting the information to be pushed to the second terminal according to the push identifier comprises:

establishing a connection with the second terminal according to the connection information and transmitting the information to be pushed to the second terminal through the connection.

According to some embodiments, the push identifier is the registration information of the second terminal; and the step of transmitting the information to be pushed to the second terminal according to the push identifier comprises:

transmitting the registration information to a server side, so that the server side transmits the information to be pushed to the second terminal according to the registration information.

According to some embodiments, the method further comprises:

providing a two-dimensional (2D) code to be scanned by the second terminal; and the step of obtaining the push identifier of the second terminal comprises:

obtaining the push identifier of the second terminal through a scanning process of the two-dimensional code.

According to some embodiments, the information to be pushed comprises a push time point, the push time point being the playing time point of the multimedia file; and the step of transmitting information relevant to a multimedia file to be pushed to the second terminal according to the push identifier comprises:

transmitting the information to be pushed to the second terminal according to the push identifier when the multimedia file is played at the playing time point.

According to some embodiments, the first terminal is a smart TV or a smart set-top box; and the information to be pushed comprises product information relevant to the multimedia file.

According to some embodiments, an information push device, applied to a first terminal for playing a multimedia file, comprises:

an identifier obtaining unit for obtaining a push identifier of a second terminal; and an information push unit for transmitting information to be pushed relevant to the multimedia file to the second terminal according to the push identifier, so that the second terminal displays the relevant information to be pushed.

According to some embodiments, the push identifier is the information used for connecting the first terminal with the second terminal; and the information push unit specifically establishes a connection with the second terminal according to the connection information, and transmits the information to be pushed to the second terminal through the connection.

According to some embodiments, the push identifier is the registration information of the second terminal; and the information push unit specifically transmits the registration information to a server side, so that the server side transmits the information to be pushed to the second terminal according to the registration information.

According to some embodiments, the device further comprises:

a two-dimensional code provision unit for providing a two-dimensional code to be scanned by the second terminal;

the identifier obtaining unit specifically obtaining the push identifier of the second terminal through a scanning process of the two-dimensional code.

According to some embodiments, the information to be pushed comprises a push time point, the push time point being the playing time point of the multimedia file;

the information push unit specifically transmits the information to be pushed to the second terminal according to the push identifier when the multimedia file is played at the playing time point.

According to some embodiments, the first terminal is a smart TV or a smart set-top box; and the information to be pushed comprises product information relevant to the multimedia file.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method as discussed herein.

In accordance with one or more embodiments, a system is provided that comprises one or more computing devices (also referred to as a "device") configured to provide functionality in accordance with such embodiments. In accordance with one or more embodiments, functionality is embodied in steps of a method performed by at least one computing device. In accordance with one or more embodiments, program code (or program logic or computer-executable instructions) is executed by a processor(s) of a computing device to implement functionality in accordance with one or more such embodiments is embodied in, by and/or on a non-transitory computer-readable medium.

From the above descriptions, the first terminal of the application can transmit the information to be pushed relevant to the multimedia file to the second terminal according to the push identifier after obtaining the push identifier of the second terminal, so as to realize the push of the information to be pushed through the first terminal to the second terminal without affecting the users' viewing experience.

BRIEF DESCRIPTION OF DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which executed via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function, a special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. As discussed below, computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G 3G or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows®, iOS® or Linux®, or a mobile operating system, such as iOS, Android®, or Windows® Mobile, or the like.

A client device may include or may execute a variety of possible applications, such as a client software application enabling communication with other devices, such as communicating one or more messages, such as via email, short message service (SMS), or multimedia message service (MMS), including via a network, such as a social network, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As discussed herein, the terms used in the application are not-limiting and are merely intended to describe specific embodiments, rather than to limit the application. In the application and the attached claims, the usage of the singular "one kind", "the said", and "the" are intended to include the plural, unless the context clearly indicates otherwise. It should also be understood that the term "and/or" used in the application means and includes any or all possible combinations of one or more associated listed items.

It should be understood that although the terms "first", "second", "third", and the like may be used in the application to describe a variety of information, which shall not be limited to these terms. These terms are used only to distinguish the same type of information from one another. For example, as long as it is not departing from the scope of the present disclosure, the first information may also be referred to as the second information; similarly, the second information may also be referred to as the first information. Depending on the context, for example, the word "if" used herein can be interpreted as "at the time of . . . " or "when . . . " or "in response to determining".

Figure 1:
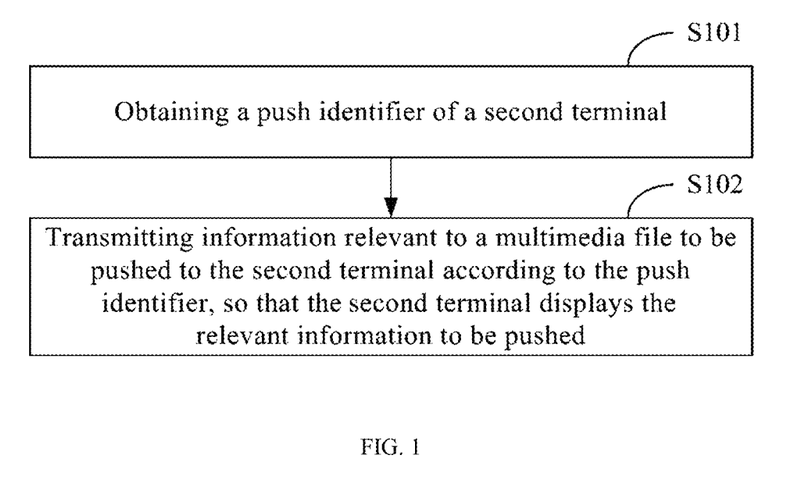
FIG. 1 is a flow diagram of an information push method according to some embodiments of the present disclosure.

FIG. 1 is a flow diagram of an information push process according to some embodiments of the present disclosure.

As disclosed in FIG. 1, an information push process can be applied to the first terminal; the first terminal is usually a smart device capable of playing multimedia files, such as, for example, smart televisions (TVs) and smart set-top boxes, and the like. The information push process can comprise the following steps:

Step 101: obtaining a push identifier of a second terminal.

In some embodiments, a first terminal can provide a two-dimensional code to be scanned by a second terminal, and can obtain the push identifier of the second terminal through a scanning process of the two-dimensional code by the second terminal. In some embodiments, the first terminal and the second terminal are two different terminals; the first terminal has at least a multimedia playing function, and the second terminal has at least an information display function. In some embodiments, the first and second terminals may be different terminals in the same local area network, or may be two different terminals connected via Bluetooth®, infrared and any other known or to be known short-range communication protocol; and, in some embodiments, the first and second terminals may be two different terminals connected to a server(s) via the Internet. For example, the first terminal is a smart TV, and the second terminal is a smart phone. The smart TV can provide a two-dimensional code in the corner of the screen, and obtain the push identifier of the smart phone from a process that the user uses via the smart phone to scan the two-dimensional code. Of course, the first terminal can also obtain the push identifier of the second terminal in other ways, for example, the push identifier can be obtained through Near Field Communication (NFC), infrared and any other known or to be known short-range communication technology. It should be understood that no special restrictions will be made in the application with respect to the providing and/or obtaining of the two-dimensional code, as discussed above.

In some embodiments, the push identifier can be used as the connection information of the second terminal (for connecting to the first terminal), such as, for example: a Internet Protocol (IP) address of the second terminal and a media access control (MAC) address of the second terminal. In some embodiments, the push identifier can also be the registration information of the second terminal, such as, for example: the account ID previously registered in the server side by the user, and the like.

Step 102: transmitting information relevant to a multimedia file via push protocol to the second terminal according to the push identifier, so that the second terminal displays the relevant pushed information.

In some embodiments, the information relevant to the multimedia file to be pushed can be arranged in advance. The information to be pushed may comprise: an information identifier, an uniform resource locator (URL) address of information, a push time point, and the like. In some embodiments, the information to be pushed can also be added in the multimedia file, or the information to be pushed can be independently stored, and the mapping relationship between the information to be pushed and the multimedia file is configured in association with one-another. It should be understood that no special restrictions will be made in the application with regard to the arrangement of the push information and the multimedia file, as any known or to be known arrangement can be used herein without departing from the scope of the instant application.

If the information to be pushed is added in the multimedia file, in this step, then the first terminal can analyze relevant information to be pushed from the multimedia file. If the information to be pushed is independently stored, in this step, then the first terminal can obtain the information to be pushed relevant to the multimedia file according to the mapping relationship.

In some embodiments, after the first terminal obtains the push identifier of the second terminal, it can establish a Wi-Fi® or Bluetooth® connection with the second terminal according to the push identifier, and then transmit the information to be pushed to the second terminal through the connection. The first terminal may also transmit the registration information of the second terminal to a server side, and the server side may transmit the information relevant to the multimedia file to be pushed to the second terminal according to the registration information of the second terminal.

In some embodiments, the first terminal or server side can transmit the information to be pushed to the second terminal during the process of playing the multimedia file. According to some embodiments, the push time point comprised in the information to be pushed can be the playing time point of the multimedia file; the first terminal or server side can transmit the information to be pushed to the second terminal when the multimedia file is played at the playing time point. For example, the first terminal or server side can monitor the playing progress of the multimedia file; after it is monitored that the multimedia file is played at the push time point of some information to be pushed, the first terminal or server side can obtain the information to be pushed from an associated (e.g., connected or accessible) computer-readable storage medium, and then transmit the information to be pushed to the second terminal. Another non-limiting example is that the first terminal or server side can start a timer for timing when the multimedia file is being played; after reaching the push time point of some information to be pushed, the first terminal or server side can obtain the information to be pushed from an associated (e.g., connected or accessible) computer-readable storage medium, and then transmit the information to be pushed to the second terminal. The second terminal displays the received information to be pushed, so as to display the information to be pushed to the users.

From the above descriptions, it is thus clear that the first terminal of the application can transmit the pushed information relevant to the multimedia file to the terminal according to the push identifier after obtaining the push identifier of the second terminal, so as to realize the push of the information through the first terminal to the second terminal without affecting users' viewing experience.

As discussed herein, the implementation process of the disclosure will be described in accordance with specific embodiments; however, such embodiments should not be construed as limiting of the disclosed systems and methods.

Figure 2:
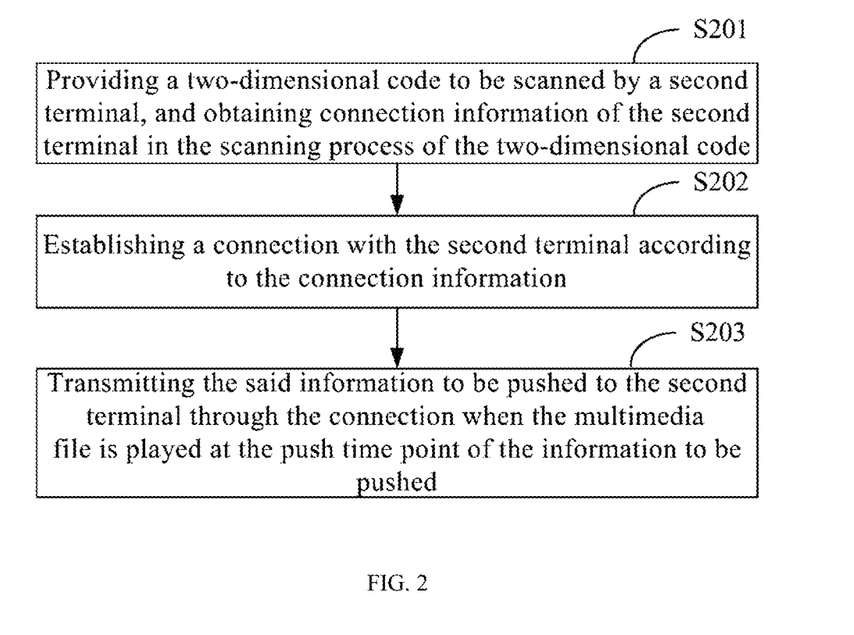
FIG. 2 is a flow diagram of an information push method according to some embodiments of the present disclosure.

FIG. 2 is a flow diagram of another information push process according to some embodiments of the instant disclosure.

In FIG. 2, the disclosed information push process can be applied to or by the first terminal; the first terminal is usually a smart device capable of playing multimedia files, such as smart TVs and smart set-top boxes. The information push process can comprise the following steps:

Step 201: providing a two-dimensional code to be scanned by a second terminal, and obtaining the connection information of the second terminal in the scanning process of the two-dimensional code.

In some embodiments, after startup of the first terminal, a two-dimensional code can be provided (e.g., displayed) on the display screen, and users can scan the two-dimensional code via relevant application pre-loaded in the second terminal. For example, after startup of the smart TV, a two-dimensional code can be provided in the lower left corner of the screen; if the user is willing to receive recommended products in the video program, the user can scan the two-dimensional code via the relevant application loaded on the mobile phone. In this embodiment, the pre-loaded relevant application can detect and recognize the two-dimensional code provided by the first terminal.

In some embodiments, the first terminal can obtain the connection information of the second terminal during the scanning process of the two-dimensional code by the second terminal. The connection information of the second terminal may comprise an IP address of the second terminal, a MAC address of the second terminal, Bluetooth® pairing information of the second terminal, and the like.

Step 202: establishing a connection with the second terminal according to the connection information.

Based on the above from Step 201, after the first terminal obtains the connection information of the second terminal, the first terminal can establish a connection with the second terminal. According to some embodiments, when the first terminal confirms to be located within the same local area network as the second terminal according to the connection information of the second terminal, the first terminal can establish a Wi-Fi® connection with the second terminal. When the connection information of the second terminal comprises Bluetooth® pairing information, the first terminal can also establish a Bluetooth® connection with the second terminal.

Step 203: transmitting the information to be pushed to the second terminal through the connection when the multimedia file is played at the push time point of the information to be pushed.

In some embodiments, the first terminal can play the multimedia files selected by the user according to the playing instruction of the user; the multimedia file may comprise: video, audio, and the like. Service providers usually set up push information of some commodities for the multimedia files as the information to be recommended to the users. For example, the service providers can add information of clothing worn by leading roles in a movie; the clothing information usually comprises the name of the clothing, purchase address, and the like. In some embodiments, the information to be pushed may comprise a push time point; the push time point is the time point for pushing the information to be pushed to the users, and usually the playing time point of the multimedia file. For example, it is assumed that a movie comprises two kinds of information to be pushed, respectively: shirt A worn by a hero and skirt B worn by a heroine; the push time points of these two kinds of information to be pushed are 20' and 40', wherein at 20' of this movie, the displayed screen shows that a hero wears shirt A; at 40' of this movie, the displayed screen shows that a heroine wears skirt B, the smart TV will send the shirt A information to the user's mobile phone when the movie is played at the time point of 20', and will send the skirt B information to the user's mobile phone when the movie is played at the time point of 40'.

In this step, when the multimedia file is played at the push time point of the information to be pushed, the first terminal transmits the information to be pushed to the second terminal through the connection established in Step 202; and then the second terminal displays the information to be pushed, so as to push the information to be pushed to the users. Taking the above case as the example once again, the smart TV will send the shirt A information to the user's mobile phone when the movie is played at the time point of 20', so as to realize synchronization between the pushed product information and the movie; if the user is interested in the shirt A, the user can browse and purchase shirt A through the mobile phone. In this process, the first terminal keeps playing multimedia files without affecting the users' viewing experience.

Figure 3:
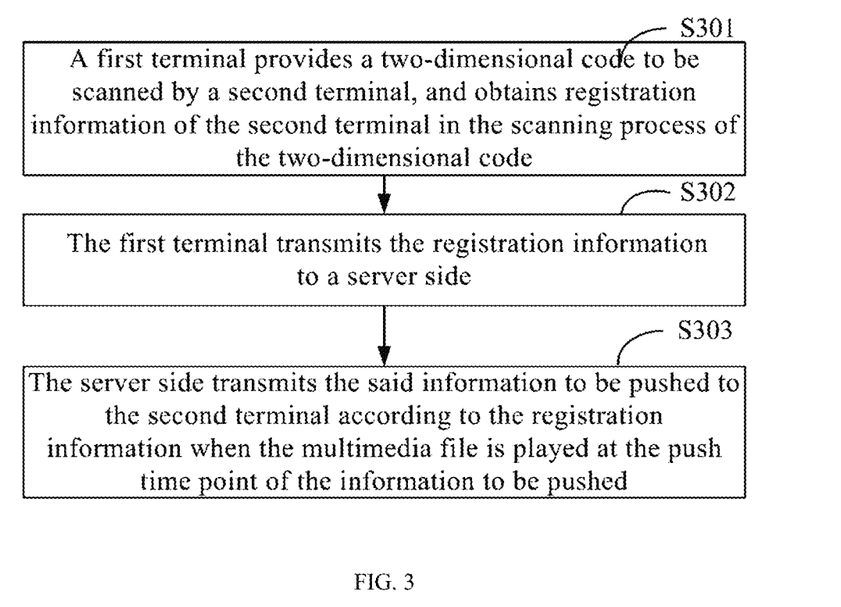
FIG. 3 is a flow diagram of an information push method according to some embodiments of the present disclosure.

FIG. 3 is a flow diagram of another information push process according to some embodiments of the instant disclosure.

In FIG. 3, an embodiment(s) of a push process is disclosed, which can comprise, but is not limited to, the following steps:

Step 301: a first terminal provides a two-dimensional code to be scanned by a second terminal, and obtains the registration information of the second terminal in the scanning process of the two-dimensional code.

In some embodiments, the first terminal is usually a smart device capable of playing multimedia files, such as, for example, smart TVs and smart set-top boxes. After startup of the first terminal, a two-dimensional code can be provided on the display screen, and the first terminal can obtain the connection information of the second terminal during the scanning process of the two-dimensional code by the second terminal.

In some embodiments, the connection information may comprise the registration information of the second terminal.

In some embodiments, the user can pre-register a user account in the server side, and then login on the server side via a relevant application loaded in the second terminal based on the user account. In this step, the first terminal can obtain such information as an identifier (ID) of the user account through a scanning process of the two-dimensional code by the second terminal.

Step 302: the first terminal transmits the registration information to a server side.

Based on the above Step 301, after the first terminal obtains the registration information of the second terminal, it can transmit the registration information to the server side; after the server side receives the registration information, it can confirm that the user corresponding to the registration information is willing to receive the push information in the playing process of the multimedia file, and then the server side saves the registration information.

Step 303: the server side transmits the information to be pushed to the second terminal according to the registration information when the multimedia file is played at the push time point of the information to be pushed.

In some embodiments, the first terminal can provide information about the multimedia file selected by the user to the server side when the registration information is sent to the server side. For example, the first terminal can provide the name of the user's on-demand movie to the server side, so that the server side obtains the information to be added to the movie according to the movie name, and transmits the information to be pushed to the second terminal according to the registration information when the movie is played at the push time point of the information to be pushed.

In some embodiments, based on the above step 302, after receiving the registration information transmitted by the first terminal, the server side can monitor the playing situation of multimedia files by the first terminal having transmitted the registration information; when the first terminal plays a multimedia file, it obtains the information to be pushed relevant to the multimedia file, and transmits the information to be pushed to the second terminal according to the registration information when the multimedia file is played at the push time point of the information to be pushed.

In some embodiments, based on the above step 302, after receiving the registration information transmitted by the first terminal, the server side can monitor the playing progress of multimedia files by the first terminal having transmitted the registration information; when the first terminal plays a multimedia file, it obtains the information to be pushed relevant to the multimedia file, and transmits all information to be pushed to the second terminal, and then transmits playing instruction to the second terminal when the multimedia file is played at the push time point of some information to be pushed; after receiving the playing instruction, the second terminal displays the information to be pushed.

For example, it is assumed that the registration information of the second terminal is an account name from a "Taobao" application. The server side will obtain all information to be pushed relevant to the movie when a movie is played by the smart TV having transmitted the account name; it is assumed that the information to be pushed relevant to the movie is backpack C, and the corresponding push time point is 50'. The server side will transmit the backpack C information to the user's mobile phone when the movie time played by the smart TV reaches the time point of 50'; the "Taobao" application loaded in the user's mobile phone pushes the backpack C information to the user, and the user can browse and purchase backpack C via the "Taobao" application. In this process, the smart TV keeps playing the movie without affecting the users' viewing experience.

Corresponding to the embodiments of the aforementioned information push process(es), the present disclosure also provides embodiments of the information push device.

Figure 4:
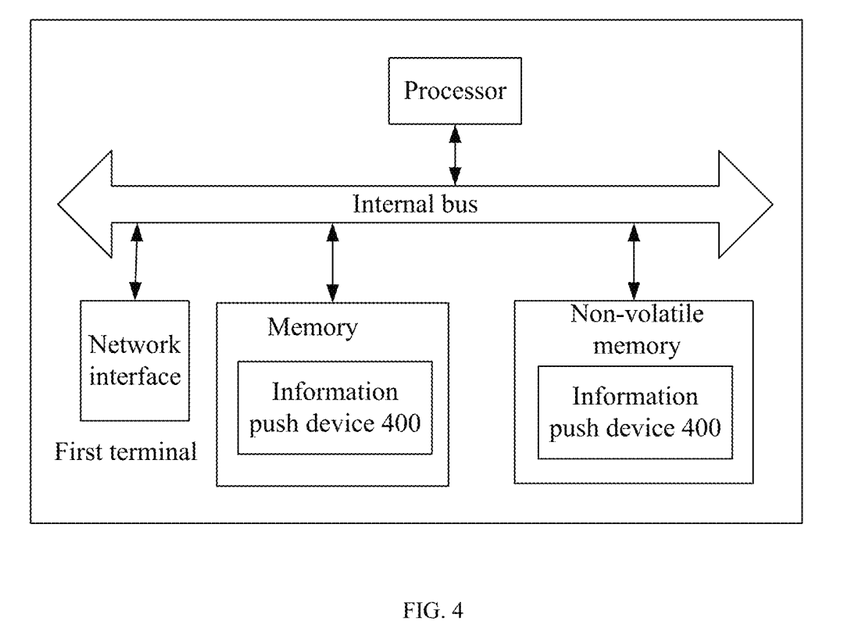
FIG. 4 is a hardware structural diagram of the first terminal where an information push device is shown according to some embodiments of the present disclosure.

According to some embodiments, the information push device utilized by the disclosed systems and methods can be the first terminal. The device embodiments may be realized by software or hardware, or may be realized through the combination of software and hardware. Take the software implementation as an example; the device, in a logical sense, is formed as the corresponding computer program instruction in non-volatile memory is read in memory to run through the processor in the first terminal. In terms of hardware, as shown in FIG. 4, it is a hardware structural diagram of push side where the information push device of the application is located; in addition to the processor, memory, network interface and non-volatile memory as shown in FIG. 4, the first terminal where the device is located in the embodiment, usually according to the actual function of the first terminal, may comprise other hardware, as understood by those of skill in the art.

Figure 5:
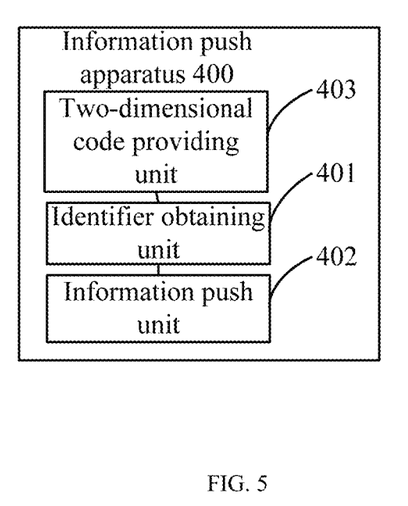
FIG. 5 is a structural diagram of an information push device according to some embodiments of the present disclosure.

Referring to FIG. 5, a structural diagram of an information push device is shown according to an exemplary, non-limiting embodiment of the present disclosure. The information push device 400 may comprise: identifier obtaining unit 401, information push unit 402 and two-dimensional code providing unit 403. It should be understood that the units discussed herein are non-exhaustive, as additional or fewer units (or sub-units) may be applicable to the embodiments of the disclosed systems and methods.

In some embodiments, the identifier obtaining unit 401 obtains a push identifier of a second terminal; and the information push unit 402 transmits information to be pushed relevant to the multimedia file to the second terminal according to the push identifier, so that the second terminal displays the relevant information to be pushed.

In some embodiments, the push identifier is the connection information used for connecting the first terminal and the second terminal; and the information push unit 402 specifically establishes a connection with the second terminal according to the connection information, and transmits the information to be pushed to the second terminal through the connection.

In some embodiments, the push identifier is the registration information of the second terminal; and the information push unit 402 specifically transmits the registration information to a server side, so that the server side transmits the information to be pushed to the second terminal according to the registration information.

In some embodiments, the two-dimensional code providing unit 403 provides a two-dimensional code to be scanned by the second terminal; and the identifier obtaining unit specifically obtains the push identifier of the second terminal through a scanning process of the two-dimensional code.

In some embodiments, the information to be pushed comprises a push time point, the push time point being the playing time point of the multimedia file; and the information push unit 402 specifically transmits the information to be pushed to the second terminal according to the push identifier when the multimedia file is played at the playing time point.

In some embodiments, the first terminal is a smart TV or a smart set-top box; and the information to be pushed comprises product information relevant to the multimedia file.

For the function and role implementation process of each unit in the above-mentioned device, please refer to the implementation process of corresponding steps in the above-mentioned processes for details.

As the device embodiments substantially correspond to the process embodiments discussed above, references can be made from the parts explaining the process embodiments for the relevant parts of the device embodiments. The device embodiments described above are merely illustrative, wherein the units described as separate parts may or may not be physically separated; the parts displayed as units may or may not be physical units; they can be located at a location, or can be distributed to multiple network elements. Part or all of units and/or modules can be selected according to actual demand, to realize the purpose of the application. For a person skilled in the art, the disclosure can be understood and implemented according to the disclosure presented herein.

For the purposes of this disclosure a unit or module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems (and processes) of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
   displaying, on a display connected to a smart device, a two-dimensional (2D) code, said display enabling a mobile terminal device to scan the displayed 2D code;
   receiving, at the smart device, an identifier (ID) associated with the mobile terminal device when the mobile terminal scans the 2D code, the ID comprising network connection information of the mobile terminal device;
   transmitting, by the smart device, the ID to a content provider;
   receiving, via the smart device, content to render on the smart device from the content provider, said content associated with the ID and comprising media content and push information, said push information comprising a push time representing a time point in the media content and digital item information associated with a digital item appearing in the media content at said push time;
   detecting, by the smart device during playback of the media content on the smart device, that a current playback position of the media content equals the push time;
   establishing, via the smart device, a network connection with the mobile terminal device using the ID at said push time; and
   communicating, by the smart device, the digital item information to the mobile terminal device using the network connection, said communication causing the mobile terminal device to display the digital item information in a mobile application executing on the mobile terminal when the digital item appears in the media content displayed on the smart device, while the smart device plays the media content.

2. The method of claim 1, further comprising:
   detecting that said mobile terminal device is scanning the displayed 2D code, wherein said mobile terminal device ID is received during said detection of the mobile terminal device scanning the displayed 2D code.

3. The method of claim 1, wherein said displayed 2D code is scannable by the mobile terminal device via a particular application associated with the mobile terminal device.

4. The method of claim 1, wherein said mobile terminal device ID comprises connection information enabling said connection between said smart device and said mobile terminal device.

5. The method of claim 4, wherein said connection information comprises network information selected from a group consisting of: an Internet Protocol (IP) address of the mobile terminal device, a media access control (MAC) address of the mobile terminal device, Bluetooth pairing information of the mobile terminal device and Wi-Fi connection information of the mobile terminal device.

6. The method of claim 4, further comprising:
determining a type of said connection information of said mobile terminal device, wherein said established network connection between the smart device and the mobile terminal device is in accordance with the determined type.

7. The method of claim 1, wherein said push information further comprises at least one of an identifier of the information associated with the media content at said push time and a uniform resource locator (URL) of the information associated with the media content at said push time.

8. The method of claim 1, wherein said detection of said push time triggers the smart device to obtain the information associated with the media content at said push time from a server.

9. A non-transitory computer-readable storage medium tangibly encoded with computer executable instructions that, when executed by a processor of a smart device, perform a method comprising:
displaying, on a display connected to the smart device, a two-dimensional (2D) code, said display enabling a mobile terminal device to scan the displayed 2D code;
receiving, at the smart device, an identifier (ID) associated with the mobile terminal device when the mobile terminal scans the 2D code, the ID comprising network connection information of the mobile terminal device;
transmitting, by the smart device, the ID to a content provider;
receiving, via the smart device, content to render on the smart device from the content provider, said content associated with the ID and comprising media content and push information, said push information comprising a push time representing a time point in the media content and digital item information associated with a digital item appearing in the media content at said push time;
detecting, by the smart device during playback of the media content on the smart device, that a current playback position of the media content equals the push time;
establishing, via the smart device, a network connection with the mobile terminal device using the ID; and
communicating, by the smart device, the digital item information to the mobile terminal device using the network connection, said communication causing the mobile terminal device to display the digital item information in a mobile application executing on the mobile terminal when the digital item appears in the media content displayed on the smart device, while the smart device plays the media content.

10. The non-transitory computer-readable storage medium of claim 9, further comprising:
detecting that said mobile terminal device is scanning the displayed 2D code, wherein said mobile terminal device ID is received during said detection of the mobile terminal device scanning the displayed 2D code.

11. The non-transitory computer-readable storage medium of claim 9, wherein said displayed 2D code is scannable by the mobile terminal device via a particular application associated with the mobile terminal device.

12. The non-transitory computer-readable storage medium of claim 9, wherein said mobile terminal device ID comprises connection information enabling said connection between said smart device and said mobile terminal device.

13. The non-transitory computer-readable storage medium of claim 12, wherein said connection information comprises network information selected from a group consisting of: an Internet Protocol (IP) address of the mobile terminal device, a media access control (MAC) address of the mobile terminal device, Bluetooth pairing information of the mobile terminal device and Wi-Fi connection information of the mobile terminal device.

14. The non-transitory computer-readable storage medium of claim 12, further comprising:
determining a type of said connection information of said mobile terminal device, wherein said established network connection between the smart device and the mobile terminal device is in accordance with the determined type.

15. The non-transitory computer-readable storage medium of claim 9, wherein said push information further comprises at least one of an identifier of the information associated with the media content at said push time and a uniform resource locator (URL) of the information associated with the media content at said push time.

16. The non-transitory computer-readable storage medium of claim 9, wherein said detection of said push time triggers the smart device to obtain the information associated with the media content at said push time from a server.

17. A system, comprising:
a processor; and
a non-transitory computer-readable storage medium for tangibly storing thereon program logic for execution by the processor, the program logic comprising:
logic, executed by a processor, for displaying, on a display connected to a smart device, a two-dimensional (2D) code, said display enabling a mobile terminal device to scan the displayed 2D code;
logic, executed by the processor, for receiving, at the smart device, an identifier (ID) associated with the mobile terminal device when the mobile terminal scans the 2D code, the ID comprising network connection information of the mobile terminal device;
logic, executed by the processor, for establishing, via the smart device, a network connection with the mobile terminal device based on the received mobile terminal device ID;
logic, executed by the processor, for transmitting the ID to a content provider;
logic, executed by the processor, for receiving, via the smart device, content to render on the smart device from a content provider, said content associated with the ID and comprising media content and push information, said push information comprising a push time representing a time point in the media content and digital item information associated with a digital item appearing in the media content at said push time;
logic, executed by the processor for detecting, during playback of the media content on the smart device, that a current playback position of the media content equals the push time;
logic, executed by the processor, for establishing, via the smart device, a network connection with the mobile terminal device using the ID; and
logic, executed by the processor, for communicating the digital item information to the mobile terminal device using the network connection, said communication causing the mobile terminal device to display the digital item information in a mobile application executing on the mobile terminal when the digital item appears in the media content displayed on the smart device, while the smart device plays the media content.

18. The system of claim 17, further comprising:

logic, executed by the processor, for detecting that said mobile terminal device is scanning the displayed 2D code, wherein said mobile terminal device ID is received during said detection of the mobile terminal device scanning the displayed 2D code, wherein said displayed 2D code is scannable by the mobile terminal device via a particular application associated with the mobile terminal device.

* * * * *